(12) United States Patent  (10) Patent No.: US 7,614,654 B2
Williams  (45) Date of Patent: Nov. 10, 2009

(54) AIRBAG CUSHION WITH DIFFUSER WITH CINCH TUBE TO VENT GAS FOR OUT-OF-POSITION CONDITIONS

(75) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 126 days.

(21) Appl. No.: 11/296,031

(22) Filed: Dec. 7, 2005

(65) Prior Publication Data

US 2007/0126219 A1   Jun. 7, 2007

(51) Int. Cl.
  *B60R 21/16* (2006.01)
(52) U.S. Cl. .................................... 280/743.1
(58) Field of Classification Search .............. 280/743.1, 280/740, 736
  See application file for complete search history.

(56) References Cited

U.S. PATENT DOCUMENTS

| | | | |
|---|---|---|---|
| 5,016,913 A | | 5/1991 | Nakajima et al. |
| 5,172,933 A | * | 12/1992 | Strasser ...................... 280/740 |
| 5,246,250 A | | 9/1993 | Wolanin et al. |
| 5,280,953 A | | 1/1994 | Wolanin et al. |
| 5,290,953 A | | 3/1994 | Clark, Jr. et al. |
| 5,306,043 A | | 4/1994 | Mihm et al. |
| 5,350,188 A | | 9/1994 | Sato |
| 5,405,166 A | | 4/1995 | Rogerson |
| 5,421,607 A | | 6/1995 | Gordon |
| 5,492,363 A | | 2/1996 | Hartmeyer et al. |
| 5,494,314 A | | 2/1996 | Kriska et al. |
| 5,603,526 A | | 2/1997 | Buchanan |
| 5,931,497 A | | 8/1999 | Fischer |
| 6,056,318 A | | 5/2000 | Braunschadel |
| 6,095,557 A | | 8/2000 | Takimoto et al. |
| 6,126,196 A | | 10/2000 | Zimmerman |
| 6,139,048 A | | 10/2000 | Braunschädel ........... 280/728.1 |
| 6,183,003 B1 | | 2/2001 | Matsuhashi et al. |
| 6,206,408 B1 | | 3/2001 | Schneider |
| 6,247,726 B1 | | 6/2001 | Ryan |
| 6,290,257 B1 | | 9/2001 | Bunce et al. |
| 6,371,509 B1 | | 4/2002 | Ellerbrok et al. |
| 6,398,258 B2 | | 6/2002 | Hamada et al. .......... 280/743.1 |
| 6,631,921 B1 | | 10/2003 | Drossler et al. |
| 6,631,922 B2 | | 10/2003 | Hess et al. |
| 6,648,371 B2 | | 11/2003 | Vendely et al. |

(Continued)

FOREIGN PATENT DOCUMENTS

JP  58005295 A  12/1983

(Continued)

OTHER PUBLICATIONS

Office Action issued Nov. 12, 2088 in co-pending U.S. Appl. No. 11/528,265.

(Continued)

*Primary Examiner*—Faye M. Fleming
(74) *Attorney, Agent, or Firm*—Sally J Brown; Stoel Rives LLP

(57) ABSTRACT

An airbag cushion is disclosed for use in automotive protective systems. The airbag cushion includes a diffuser for re-directing gas out of the cushion via cinch tubes when an obstruction is encountered.

17 Claims, 12 Drawing Sheets

U.S. PATENT DOCUMENTS

| | | | |
|---|---|---|---|
| 6,746,045 | B2 | 6/2004 | Short et al. |
| 6,773,027 | B2 | 8/2004 | Bohn et al. |
| 6,773,030 | B2 | 8/2004 | Fischer |
| 6,832,778 | B2 | 12/2004 | Pinsenschaum et al. |
| 6,863,304 | B2 | 3/2005 | Reiter, et al. |
| 6,918,613 | B2 | 7/2005 | Short et al. |
| 6,932,385 | B2 | 8/2005 | Hawthorn et al. |
| 6,971,671 | B2 | 12/2005 | Schneider et al. |
| 7,059,634 | B2 | 6/2006 | Bossecker et al. |
| 7,083,191 | B2 | 8/2006 | Fischer |
| 7,083,192 | B2 | 8/2006 | Fischer et al. |
| 7,210,702 | B2 | 5/2007 | Soderquist |
| 7,237,802 | B2 | 7/2007 | Rose et al. |
| 7,261,319 | B2 | 8/2007 | DePottey et al. |
| 7,328,915 | B2 | 2/2008 | Smith et al. |
| 7,347,450 | B2 | 3/2008 | Williams et al. |
| 7,360,789 | B2 | 4/2008 | Bito |
| 7,364,192 | B2 | 4/2008 | Braun et al. |
| 2003/0020266 | A1 | 1/2003 | Vendely et al. |
| 2003/0020268 | A1 | 1/2003 | Reiter et al. |
| 2003/0057691 | A1 | 3/2003 | Tokita et al. |
| 2003/0127839 | A1 | 7/2003 | Jenkins |
| 2003/0209895 | A1 | 11/2003 | Gu |
| 2003/0214125 | A1 | 11/2003 | Schneider et al. |
| 2004/0012179 | A1 | 1/2004 | Pinsenschaum et al. |
| 2004/0056459 | A1 | 3/2004 | Kassman et al. |
| 2004/0090054 | A1 | 5/2004 | Bossecker et al. |
| 2004/0130135 | A1 | 7/2004 | Ekdahl |
| 2004/0188990 | A1 | 9/2004 | Short et al. |
| 2004/0256842 | A1 | 12/2004 | Breed |
| 2005/0052008 | A1 | 3/2005 | Rose et al. |
| 2005/0098990 | A1 | 5/2005 | Pinsenschaum et al. |
| 2005/0236822 | A1 | 10/2005 | Rose et al. |
| 2005/0248137 | A1 | 11/2005 | Delventhal et al. |
| 2006/0071461 | A1 | 4/2006 | Williams et al. |
| 2006/0071462 | A1 | 4/2006 | Smith et al. |
| 2006/0151979 | A1 | 7/2006 | DePottey et al. |
| 2006/0197327 | A1* | 9/2006 | Maripudi et al. ............ 280/740 |
| 2006/0202454 | A1 | 9/2006 | Parizal et al. |
| 2007/0052222 | A1 | 3/2007 | Higuchi et al. |
| 2007/0108750 | A1 | 5/2007 | Bauer et al. |
| 2007/0126218 | A1 | 6/2007 | Schnieder et al. |
| 2007/0126219 | A1 | 6/2007 | Williams |
| 2007/0132222 | A1 | 6/2007 | Thomas et al. |
| 2007/0205590 | A1 | 9/2007 | Klinkenberger et al. |
| 2008/0007038 | A1 | 1/2008 | Fischer et al. |
| 2008/0018086 | A1 | 1/2008 | Ford et al. |
| 2008/0023950 | A1 | 1/2008 | Kalczynski et al. |
| 2008/0023959 | A1 | 1/2008 | Crawford |
| 2008/0073890 | A1 | 3/2008 | Williams et al. |
| 2008/0073891 | A1 | 3/2008 | Rose et al. |
| 2008/0073892 | A1 | 3/2008 | Rose et al. |
| 2008/0073893 | A1 | 3/2008 | Schneider |
| 2008/0079250 | A1 | 4/2008 | Boyle et al. |
| 2008/0303256 | A1 | 12/2008 | Williams |
| 2009/0039630 | A1 | 2/2009 | Schneider et al. |

FOREIGN PATENT DOCUMENTS

| | | | |
|---|---|---|---|
| JP | | 2001 158315 | 6/2001 |

OTHER PUBLICATIONS

Office Action issued Nov. 18, 2008 in co-pending U.S. Appl. No. 11/528,265.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843.
Response to First Office Action filed in co-pending U.S. Appl. No. 10/832,843.
Interview Summary issued Jun. 15, 2006 in co-pending U.S. Appl. No. 10/832,843.
Notice of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and Response to Office Action filed Feb. 20, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct. 5, 2007 in co-pending U.S. Appl. No. 10/959,387.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action filed Feb. 15, 2007 in co-pending U.S. Appl. No. 10/959,256.
Office Action issued May 21, 2007 in co-pending U.S. Appl. No. 10/959,256.
Amendment and Response to Office Action filed Aug. 16, 2007 in co-pending U.S. Appl. No. 10/959,256.
Notice of Allowance issued Nov. 27, 2007 in co-pending U.S. Appl. No. 10/959,256.
Office Action issued Jan. 2, 2009 in co-pending U.S. Appl. No. 11/528,042.
Office Action issued Jul. 11, 2008 in co-pending U.S. Appl. No. 11/528,118.
Amendment and Response to Office Action filed Nov. 24, 2008 in co-pending U.S. Appl. No. 11/528,118.
Interview Summary issued Dec. 15, 2008 in co-pending U.S. Appl. No. 11/528,118.
Notice of Allowance issued Feb. 10, 2009 in co-pending U.S. Appl. No. 11/528,118.
Office Action issued Jun. 30, 2008 in co-pending U.S. Appl. No. 11/528,266.
Amendment and Response to Office Action filed Dec. 1, 2008 in co-pending U.S. Appl. No. 11/528,266.
Interview Summary issued Dec. 16, 2008 in co-pending U.S. Appl. No. 11/528,266.
Notice of Allowance issued Jan. 14, 2009 in co-pending U.S. Appl. No. 11/528,266.
Summary of Interview filed Jan. 16, 2009 in co-pending U.S. Appl. No. 11/528,266.
Office Action issued Dec. 2, 2008 in co-pending U.S. Appl. No. 11/758,419.
Office Action issued Apr. 7, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action issued Sep. 26, 2006 in co-pending U.S. Appl. No. 11/031,394.
Interview Summary issued Jan. 23, 2007 in co-pending U.S. Appl. No. 11/031,394.
Amendment and Response to Office Action filed Mar. 26, 2007 in co-pending U.S. Appl. No. 11/031,394.

Notice of Allowance issued May 7, 2007 in co-pending U.S. Appl. No. 11/031,394.

Office Action issued Jun. 25, 2007 in co-pending U.S. Appl. No. 11/031,394.

Notification of Transmittal of the International Search Report and the Written Opinion of the International Searching Authority issued Oct. 19, 2006 in International Application No. PCT/US2005/025416.

Notification of Transmittal of the International Search Report and the Written Opinion of the International Searching Authority issued Dec. 15, 2006 in International Application No. PCT/US2005/027255.

Notification of Transmittal of the International Search Report and the Written Opinion of the International Searching Authority issued Sep. 5, 2007 in International Application No. PCT/US2006/045441.

Notification of Transmittal of the International Search Report and the Written Opinion of the International Searching Authority issued Mar. 9, 2007 in International Application No. PCT/US2005/038175.

Notification of Transmittal of the International Search Report and the Written Opinion of the International Searching Authority issued Oct. 22, 2008 in International Application No. PCT/US2008/071337.

Notification of Transmittal of the International Search Report and the Written Opinion of the International Searching Authority issued Aug. 15, 2008 in International Application No. PCT/US2008/060226.

Notice of Allowance issued Apr. 2, 2009 in co-pending U.S. Appl. No. 11/295,953.

Notice of Allowance issued Mar. 23, 2009 in co-pending U.S. Appl. No. 11/528,118.

Office Action issued Mar. 19, 2009 in co-pending U.S. Appl. No. 11/528,266.

Amendment and Response to Office Action filed Apr. 17, 2009 in co-pending U.S. Appl. No. 11/589,316.

Amendment and Response to Office Action filed Apr. 21, 2009 in co-pending U.S. Appl. No. 11/758,419.

Amendment and Response to Office Action filed Mar. 16, 2009 in co-pending U.S. Appl. No. 11/528,265.

\* cited by examiner

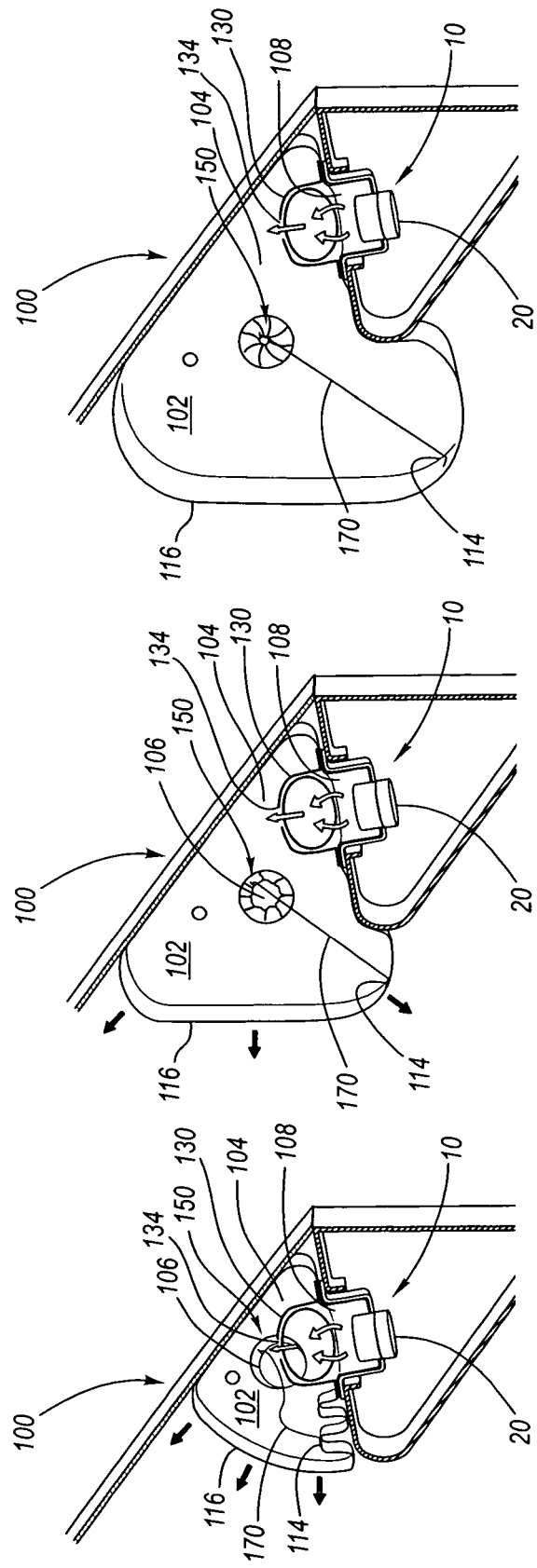

AIRBAG CUSHION WITH DIFFUSER WITH CINCH TUBE TO VENT GAS FOR OUT-OF-POSITION CONDITIONS

RELATED APPLICATION

This application claims priority to U.S. patent application Ser. No. 10/959,256 titled AIRBAG CUSHION WITH CINCH TUBE FOR REDUCED OUT-OF-POSITION EFFECTS which was filed on Oct. 6, 2004. Ser. No. 10/959,256 is hereby incorporated by reference.

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 2A is a cross-sectional view of an embodiment of a deploying airbag cushion.

FIG. 2B is a cross-sectional view of the deploying airbag cushion of FIG. 2A.

FIG. 2C is a cross-sectional view of an embodiment of a deploying airbag cushion of FIGS. 2A and 2B.

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas such as a cinch tube. Each cinch tube may be closed via a component such as a cinch cord. The cinch cord may be connected at one end to a cinch tube and at an opposing end within the cushion. A diffuser may also be positioned in the cushion to optimize the flow of gas out of the cinch tubes. It is desirable to include a diffuser in most embodiments of the cushion due to the ability of a diffuser to enable the rapid escape of the gas out of the cushion via the cinch tubes. Numerous embodiments of cinch cords are disclosed including cinch cords configured to incrementally close the cinch tube.

If an occupant is in close proximity to the deploying airbag and restricts normal inflation, the cinch tube remains open and allows gas to rapidly escape. If the occupant is in a normal position and inflation is unrestricted, the tension pulls on the cinch cord to quickly close the cinch tube. Closure retains gas for normal occupant restraint. Thus, the cinch tube may be used as a variable feature in out-of-position conditions and in normal restraint conditions. In this manner, the airbag cushion is sensitive to obstructive expansion of the cushion.

Figure 1:
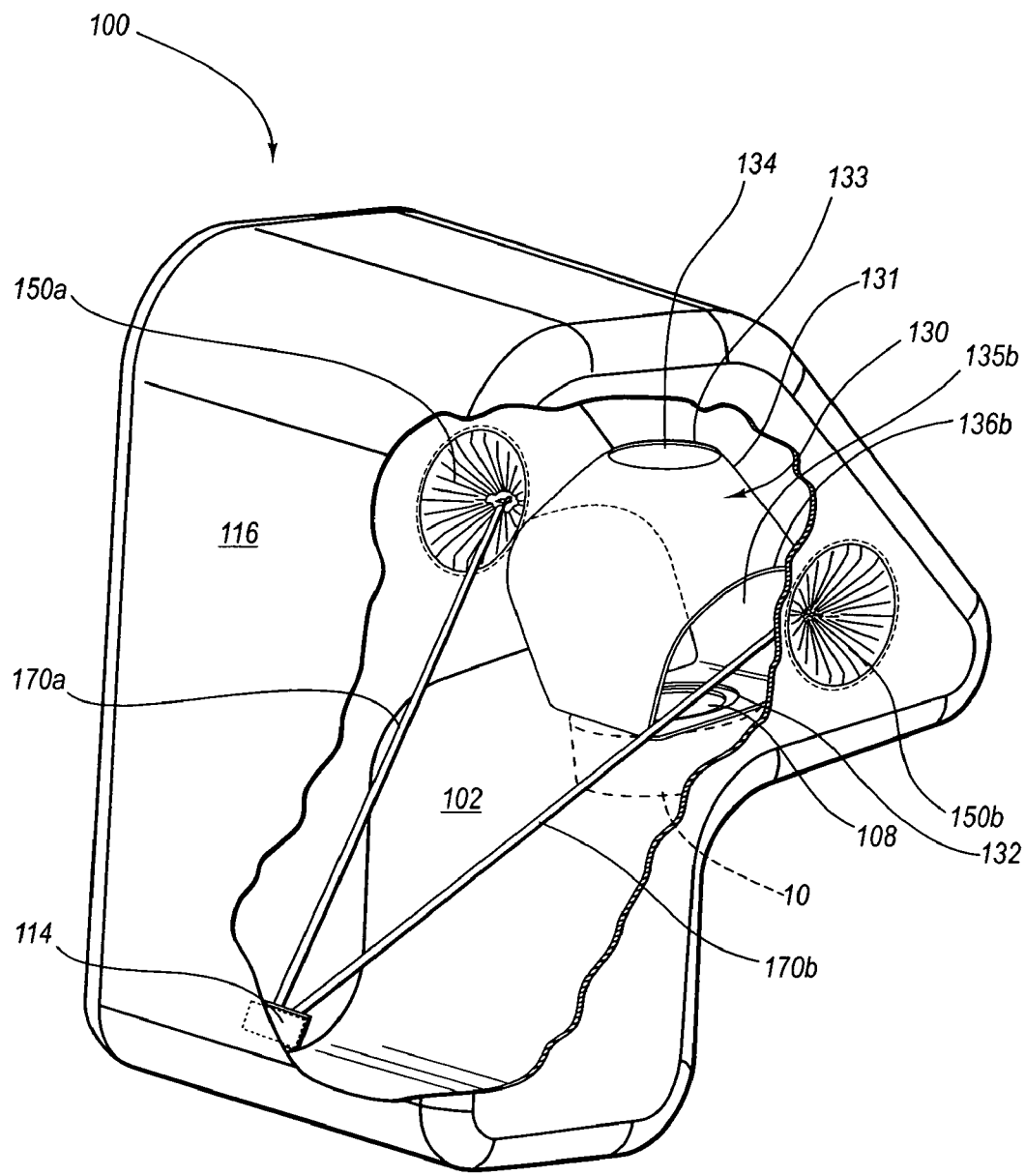
FIG. 1 is a perspective view of an airbag cushion with a partial cut-away to show the diffuser, cinch tubes and cinch cords.

With reference now to the accompanying figures, particular embodiments of the invention will now be described in greater detail. FIG. 1 is a perspective view which shows a housing 10 of an airbag module having an inflator 20 (not shown in FIG. 1) delivering gas into an airbag cushion 100 of an airbag module via a diffuser 130 within airbag cushion 100. Cinch tubes 150a-b are closed as cinch cords 170a-b have been pulled taut by expansion of the cushion due to the pressure of the gas in airbag cushion 100.

Some of the structures of the airbag cushion 100 are best seen with reference to FIGS. 2A-2C. Airbag cushion 100 has an interior 102 and an interior surface 104. Aperture 106 in the surface 104 provides an opening for gas to exit interior 102 of airbag cushion 100 via cinch tubes 150. Gas enters interior 102 via another opening in surface 104, throat 108. Attachment area 114 is a portion of surface 104 which serves as an attachment location for an end of cinch cord 170. Alternatively, cinch cord 170 is anchored via loop 115 which is described below with reference to FIG. 9. The attachment area may be disposed elsewhere such as proximate to a different portion of surface 104. Alternatively, the attachment area may be a portion of an exterior surface such as face surface 116, which is the surface of the airbag cushion directed to the occupant. Thus, the cinch cord 170 may extend through the interior 150 of the airbag cushion 100 or may be positioned exterior to the airbag cushion 100. The location of the attachment area 114 depends on module deployment angle, vehicle interior geometry, and cushion fold type.

Diffuser 130 is configured to create a pressure pocket and re-direct the inflation gas to the cinch tubes. The embodiment of the diffuser shown in FIG. 1 at 130 is pentagon shaped and comprises a material 131 which may be integral with a surface of cushion 100 or attached to cushion 100. For example, diffuser 130 may be sewn together with the cushion. Diffuser 130 receives gas via throat 108 through opening 132. Perimeter 133 defines direct opening 134. Direct opening 134 assists with normal inflation of cushion 100 to assist in getting cushion 100 in position in time for dynamic loading purposes. Side openings 135a (not shown in FIG. 1) and 135b are respectively defined by perimeters 136a (not shown in FIG. 1) and 136b. The gas is directed out of direct opening 134 and side openings 135a-35b. Gas directed out of side openings 135a-b is vented out of cinch tubes 150a-b. Note that in other embodiments, the diffuser may have other shapes. For example, the diffuser may be rectangular, trapezoidal, hexagonal, round, etc. It may also have a portion which is round or elliptical while other portions are angled.

Figure 8:
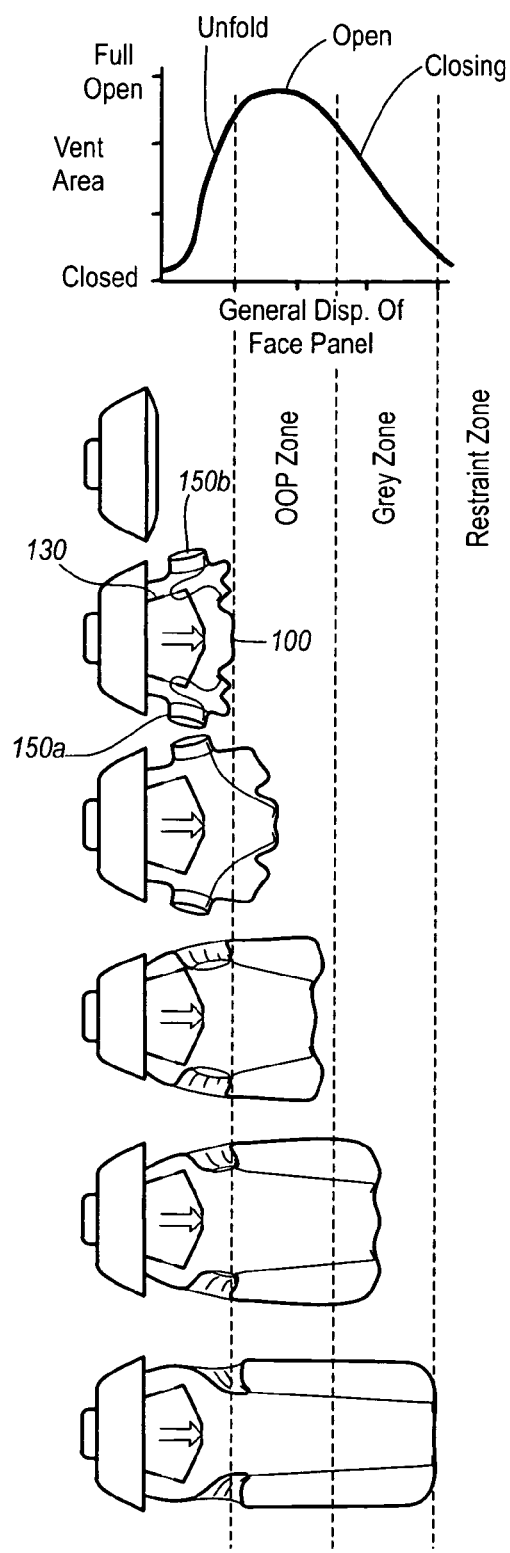
FIG. 8 is a diagram illustrating an airbag cushion venting graph in relation to an airbag cushion's deployment.

Not only are side openings 135a-b strategically located to redirect the gas flow generally toward cinch tubes 150a-b and out of cushion 100 but side openings 135a-b, are also sized for optimal gas flow. Side openings 135a-b are large enough to allow most of the gas to flow through them. Only in out-of-position conditions does the focused gas flow from diffuser 130 to the aligned cinch tubes 150a-b to allow a more rapid escape of the inflation gas as shown in FIG. 8.

If the occupant is in a normal position and inflation is unrestricted, diffuser 130 functions as normal to re-direct the inflation gas generally toward the cinch tube(s). However, because diffuser 130 and cinch tubes 150a-b are independent of each other, the cushion side panels can extend beyond diffuser 130 such that the flow is not aligned or focused with cinch tubes 150a-b as shown in FIG. 8. This behavior helps minimize gas leakage. The large cinch tube(s) are quickly closed as the cushion fully expands retaining gas for normal occupant restraint.

FIGS. 2A-2C provide a cross-sectional view of an airbag cushion 100 deploying from a housing 10. For illustrative purposes, a single cinch tube 150 is shown in FIGS. 2A-2C but airbag cushion 100 may include multiple cinch tubes to provide required venting capability as shown in other embodiments.

Cinch tube 150 circumvents aperture 106 in surface 104 of airbag cushion 100. Cinch tube 150 may be embodied with a generally cylindrical shape and having opposing open ends to enable gas venting. The cinch tube may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

As described above, airbag cushion 100 includes a cinch cord 170 that couples or engages the cinch tube 150 and couples to a surface 114 of the airbag cushion 100. The cinch cord 170 may comprise a nylon material or other suitable material known in the art.

In FIG. 2A, the initially deploying airbag cushion 100 has a slack cinch cord 170 and the cinch tube 150 remains open. In FIG. 2B, the cinch cord 170 is pulled taut and the cinch tube 150 begins to close. In FIG. 2C, the cinch cord 170 is completely taut and the cinch tube 150 is closed.

Figure 3A:
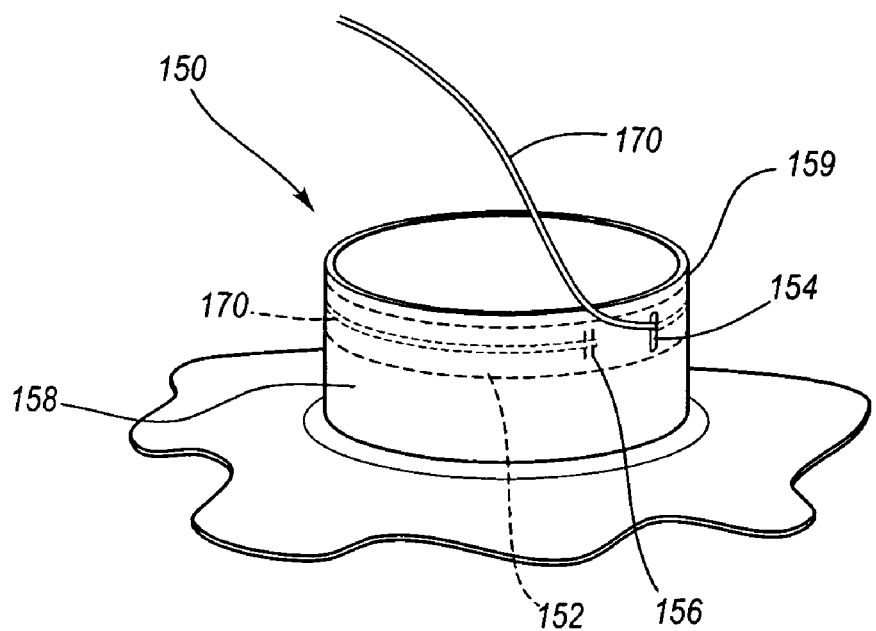
FIG. 3A is a perspective view of an embodiment of a cinch tube.
Figure 3B:
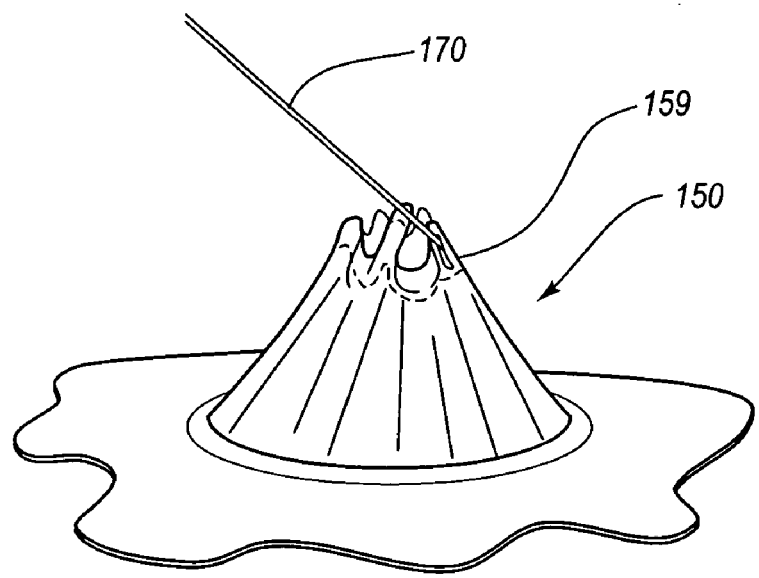
FIG. 3B is a perspective view of the cinch tube of FIG. 3A.

Referring to FIGS. 3A and 3B, perspective views of one embodiment of a cinch tube 150 in both the open and closed positions are shown. Cinch cord 170 circumvents a majority of the perimeter 158 of cinch tube 150 in order to properly tighten and restrict the cinch tube 150. Cinch cord 170 has a length that includes an initial free length and a circumference of cinch tube 150. Cinch cord 170 may be disposed within a sleeve 152 that is formed within cinch tube 150. Access to the sleeve 152 is through a sleeve aperture 154 formed in cinch tube 150. Cinch cord 170 enters sleeve aperture 154, feeds through sleeve 154, and is coupled at an end 156 within sleeve 152 to cinch tube 150. Coupling may be achieved by stitches, bonds, adhesives, etc. FIG. 3B shows rim 159 collapsed on itself to close cinch tube 150.

Figure 4:
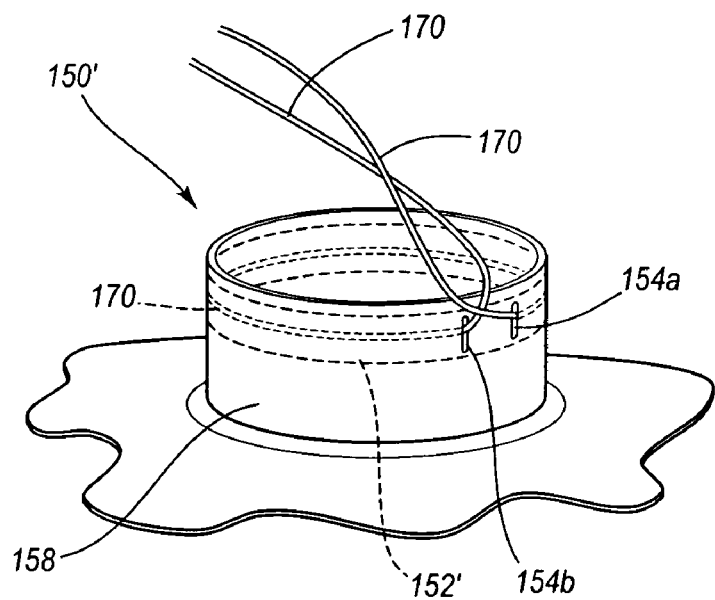
FIG. 4 is a side view of an another embodiment of a cinch tube.

Referring to FIG. 4, an alternative embodiment of a cinch tube 150' is shown wherein a cinch cord 170 loops around the majority of the perimeter (identified at 158) of cinch tube 150'. Cinch tube 150' includes first and second sleeve apertures 154 a-b that are in communication with sleeve 152' formed within cinch tube 150'. Cinch cord 170 enters the first sleeve aperture 154a, extends along the sleeve 152', and exits out the second sleeve aperture 154b.

Figure 5:
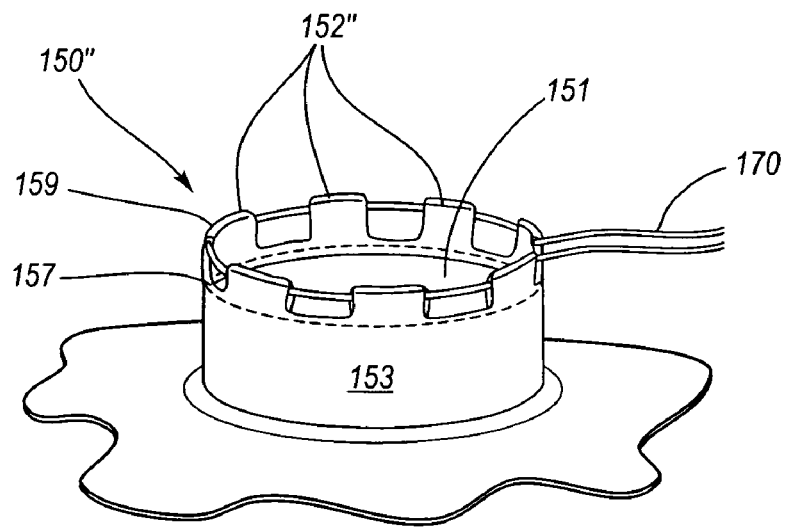
FIG. 5 is a side view of an additional embodiment of a cinch tube.

Referring to FIG. 5, an alternative embodiment of a cinch tube 150" is shown wherein the cinch tube 150" includes a plurality of cinch loops 152" which collectively act as a sleeve. Cinch loops 152" may be disposed on a periphery as shown or on an inner surface 151 or an outer surface 153 of the cinch tube 150". A cinch cord 170 is fed through the cinch loops 152" and is thereby able to restrict the cinch tube 150" as needed.

Figure 6A:
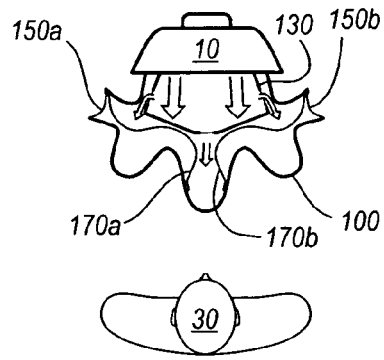
FIG. 6A is a cross-sectional view illustrating initial deployment of an airbag cushion for an occupant in a normal position.
Figure 6B:
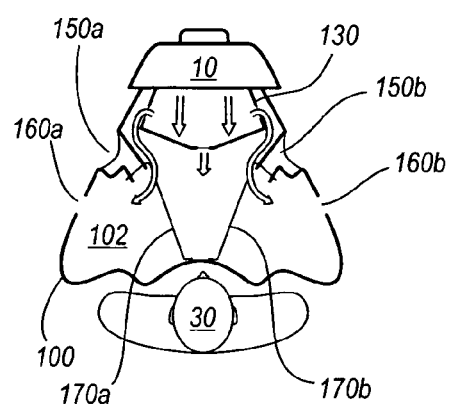
FIG. 6B is a cross-sectional view illustrating a deploying airbag cushion which is partially deployed as it encounters an occupant in a normal position.
Figure 6C:
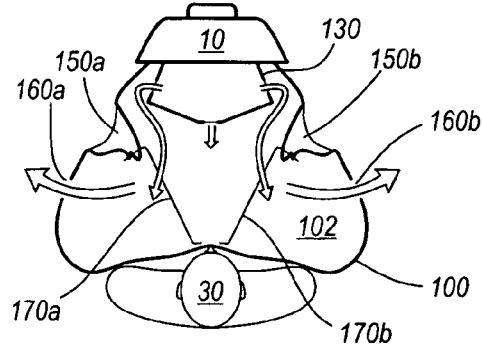
FIG. 6C is a cross-sectional view of an airbag cushion which has closed cinch tubes to enable the airbag cushion to fully deploy.

FIGS. 6A-C illustrate three stages of a deploying airbag cushion 100 without obstruction in the deploying path. The depicted airbag cushion 100 includes two cinch tubes 150a-b symmetrically disposed on the cushion 100 and two vents 160a-b symmetrically disposed on the cushion 100. Vents 160a-b provide consistent venting of the airbag cushion 100 and are not restricted by an occupant's position. Vents 160*a-b* may be optional in certain cushion embodiments based on venting requirements. The locations for cinch tubes 150*a-b* and vents 160*a-b* may vary as does the number of cinch tubes and vents. An occupant 30 is in a normal seating position which will allow the airbag cushion 100 to fully expand before impacting the occupant. In this manner, the occupant 30 benefits from the full restraint capability of the airbag cushion 100.

In FIG. 6A, the initial breakout of the airbag cushion 100 occurs. The cinch tubes 150*a-b* are open and, in the depicted embodiment, extend from the airbag cushion 100. In FIG. 6B, cinch cords 170*a-b* which respectively correspond with cinch tubes 150*a-b* are pulled taut and gas flow through cinch tubes 150*a-b* is restricted. Cinch tubes 150*a-b* may also be pulled within the interior 102 of the airbag cushion 100. In FIG. 6C, cinch tubes 150*a-b* are completely closed, the gas vents through the vents 160*a-b*, and normal restraint is provided to the occupant 30.

Because cushion 100 is initially in a folded condition, at initial breakout (such as the initial 7 milliseconds), cinch tubes 150*a-b* are initially non-functional. If an occupant is not positioned directly in front of the airbag cushion 100, cushion 100 unfolds and is allowed to pressurize normally, and gas is vented through smaller, restraint control vents 160*a-b* as the occupant loads cushion 100. Vents 160*a-b* may be located in the side panels of cushion 100 near cinch tubes 150*a-b*, as shown. In some embodiments, tubes 150*a-b* may function as restraint control vents by controlling the closure area.

Figure 7A:
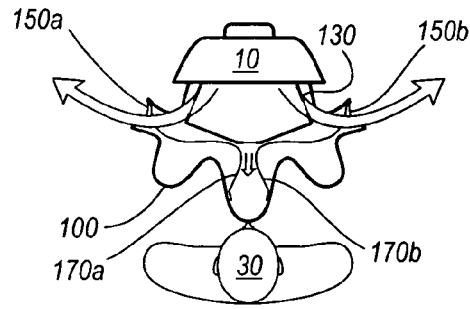
FIG. 7A is a cross-sectional view illustrating initial deployment of an airbag cushion for an out-of-position occupant.
Figure 7B:
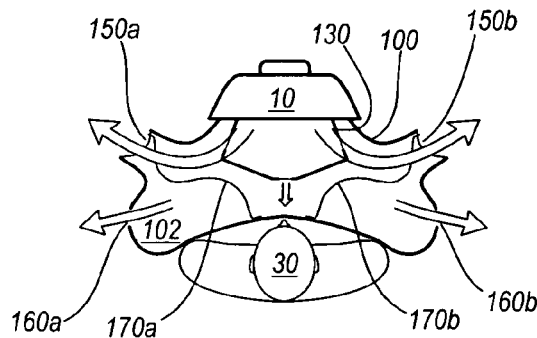
FIG. 7B is a cross-sectional view illustrating a deploying airbag cushion which is only partially deployed as it has encountered an out-of-position occupant.
Figure 7C:
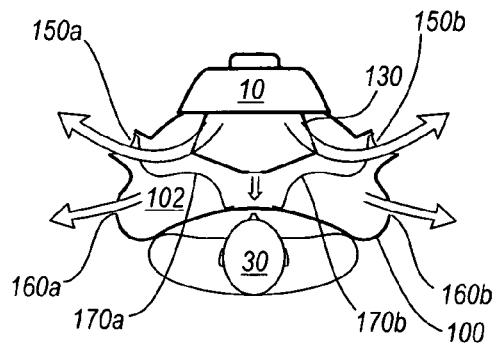
FIG. 7C is a cross-sectional view of an airbag cushion which remains only partially deployed as the cinch tubes remain open to prevent full deployment of the airbag cushion.

FIGS. 7A-C illustrate three stages of a deploying airbag cushion 100 with obstruction in the deploying path. An occupant 30 is out-of-position and obstructs the deploying airbag cushion 100 and prevents the airbag cushion 100 from fully inflating. In FIG. 7A, airbag cushion 100 begins initial deployment as in FIG. 6A. In FIG. 7B, airbag cushion 100 impacts the occupant 30 and the cinch cords 170*a-b* remain slack. The cinch tubes 150*a-b* remain open and venting rapidly occurs from tubes 150*a-b* and vents 160*a-b*. The cushion inflation is restricted but the occupant 30 receives less than the full deployment loading of the cushion 100. In FIG. 7C, cushion 100 is partially inflated and provides limited restraint. Venting continues through tubes 150*a-b* and vents 160*a-b*.

Referring to FIG. 8, a graph illustrating cinch tube venting as a function of airbag cushion displacement is shown. For reference, an airbag cushion 100 is shown in various stages of deployment. The airbag cushion 100 includes a diffuser 130 and two symmetrically disposed cinch tubes 150*a-b*. During initial deployment, airbag cushion 100 is unfolding and cinch tubes 150*a-b* provide little or no venting. Airbag cushion 100 expands into an out-of-position zone where, if obstructed, the cinch tubes 150*a-b* will remain completely or nearly open and full venting occurs. In this zone an occupant does not receive the full restraint capability but does benefit from limited restraint. If unobstructed, airbag cushion 100 expands into a gray zone where partial closure of the cinch tubes 150*a-b* begins and venting is limited. Cinch tubes 150*a-b* may be pulled into the airbag cushion 100 depending on the cushion design. If further unobstructed, airbag cushion 100 fully expands to the restraint zone. At this zone, cinch tubes 150*a-b* completely close and an occupant benefits from the full restraint capability of airbag cushion 100.

Early in a normal inflation, gas loss through cinch tube 150*a-b* is minimal even with diffuser 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 108. Since pressure outside the cushion is still atmospheric, there is a pressure imbalance and air flows into the cushion, not out of the cushion, when the cinch tube is positioned alongside of the gas flow stream and not in its path.

Figure 9:
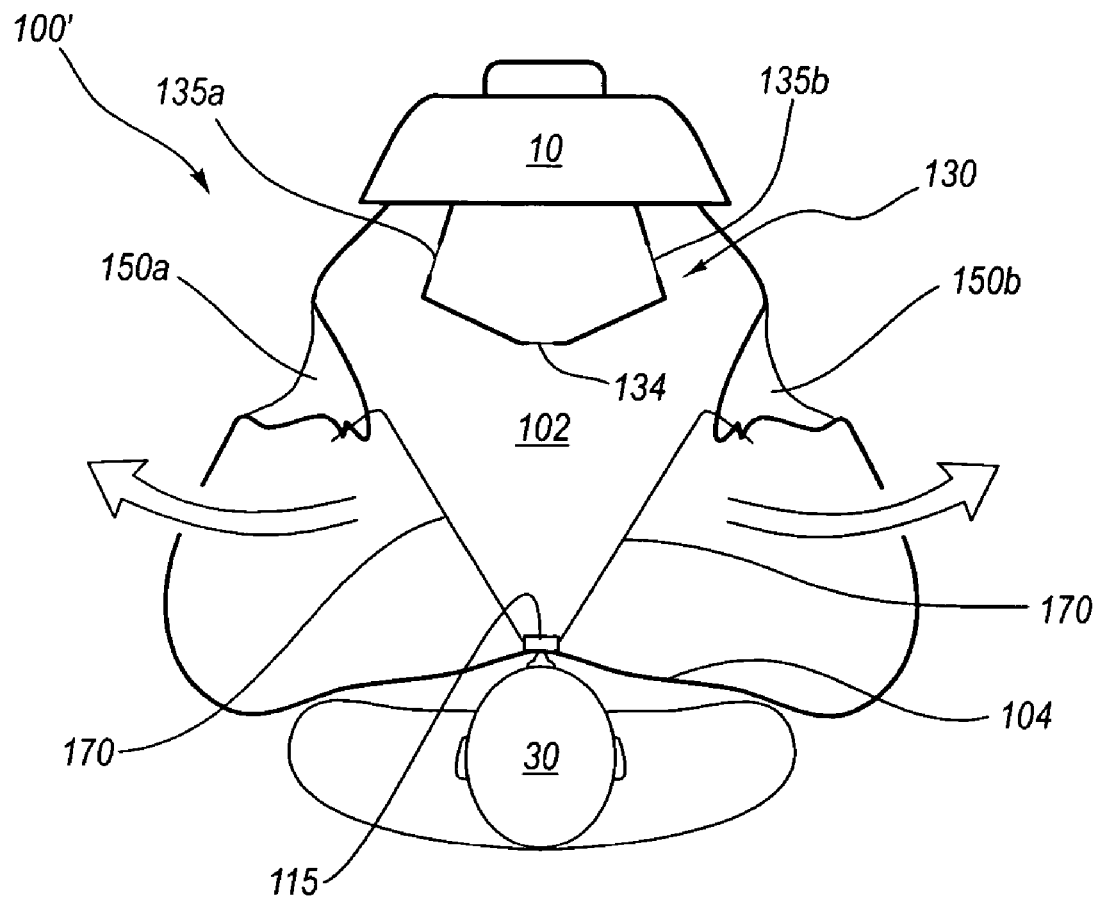
FIG. 9 is a cross-sectional view of an alternative embodiment of a deployed airbag cushion.

Referring to FIG. 9, an alternative embodiment of an airbag cushion 100' is shown. Airbag cushion 100' includes two symmetrical cinch tubes 150*a-b* that may be embodied as described above. Cinch tubes 150*a-b* have been pulled completely into the airbag cushion interior 102. Rather than having cinch cords corresponding to each cinch tube, a single cinch cord 170 is used. Cinch cord 170 is coupled to or engages each cinch tube in a manner similar to that previously described. The cinch cord 170 passes through a cord loop 115 that is coupled to an interior surface 104. The cord loop 115 may be formed of a fabric material similar or identical to that of the airbag cushion 100'. Cinch cord 170 may freely pass through loop 115 and may therefore be referred to as a "floating" cinch cord. In an alternative embodiment, the cinch cord may be disposed on the airbag cushion exterior and passes through a cord loop coupled to an exterior surface of the airbag cushion 100'. In either embodiment, airbag cushion deployment pulls cinch cord 170 taut and closes both cinch tubes 150*a-b*.

Figure 10:
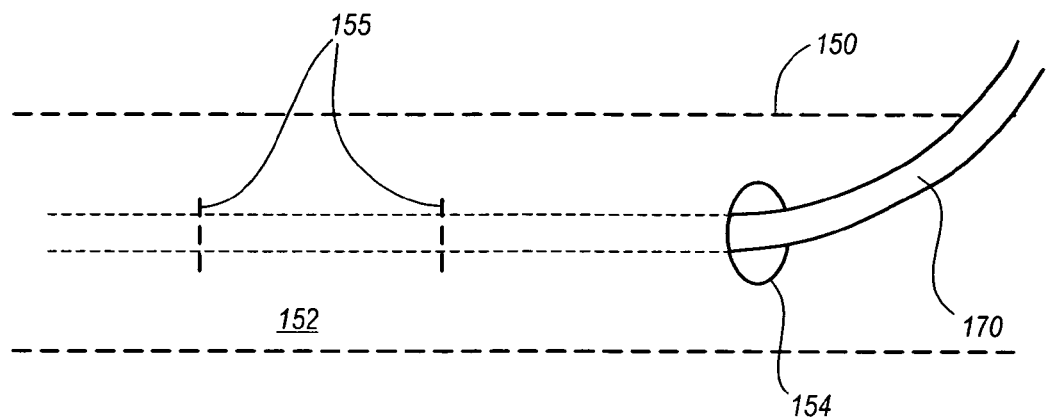
FIG. 10 is a side view of a cinch cord within a sleeve of a cinch tube which is held temporarily by tack stitching.

Referring to FIG. 10, cinch cord 170 is shown disposed within cinch tube 150. Cinch tube 150 includes a sleeve 152 that extends around a periphery of the cinch tube 150 and houses a portion of the cinch cord 170. Cinch cord 170 exits from sleeve 152 through sleeve aperture 154. The cinch tube 150 further includes tack stitching 155 that is inserted through sleeve 152 and cinch cord 170 to retain cinch cord 170 and prevent inadvertent closing of the cinch tube 150 during shipping and handling. Tack stitching 155 is designed to be easily broken and provides no interference to airbag cushion deployment.

Figure 11:
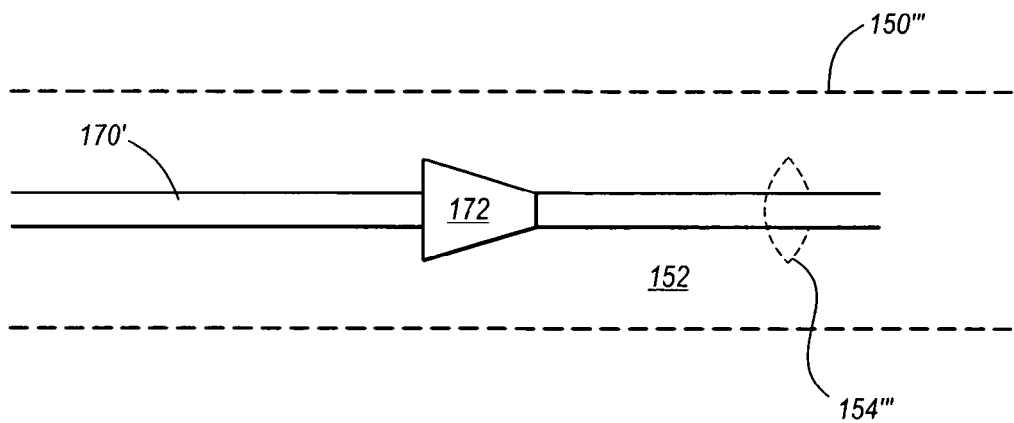
FIG. 11 is a side view of a cinch cord which has a stopper to prevent the cinch cord from retreating within the sleeve of a cinch tube after it has been advanced within the sleeve.

Referring to FIG. 11, an embodiment of a cinch cord is shown at 170' having a stopper 172. Cinch cord 170' is shown partially disposed within sleeve 152 with a portion extending through sleeve aperture 154'''. Stopper 172 of cinch cord 170' is disposed within the sleeve 152 prior to airbag cushion deployment. Stopper 172 is sized and configured to permit deploying movement, i.e. from sleeve 152 and through aperture 154''', but does restrict movement through aperture 154'''. In operation, stopper 172 prevents cinch tube 150''' from reopening after deployment and closure of the cinch tube 150'''. This may occur during deflation of an airbag cushion as the cinch cord becomes slack. Venting is thereby directed to other vents.

Figure 12A:
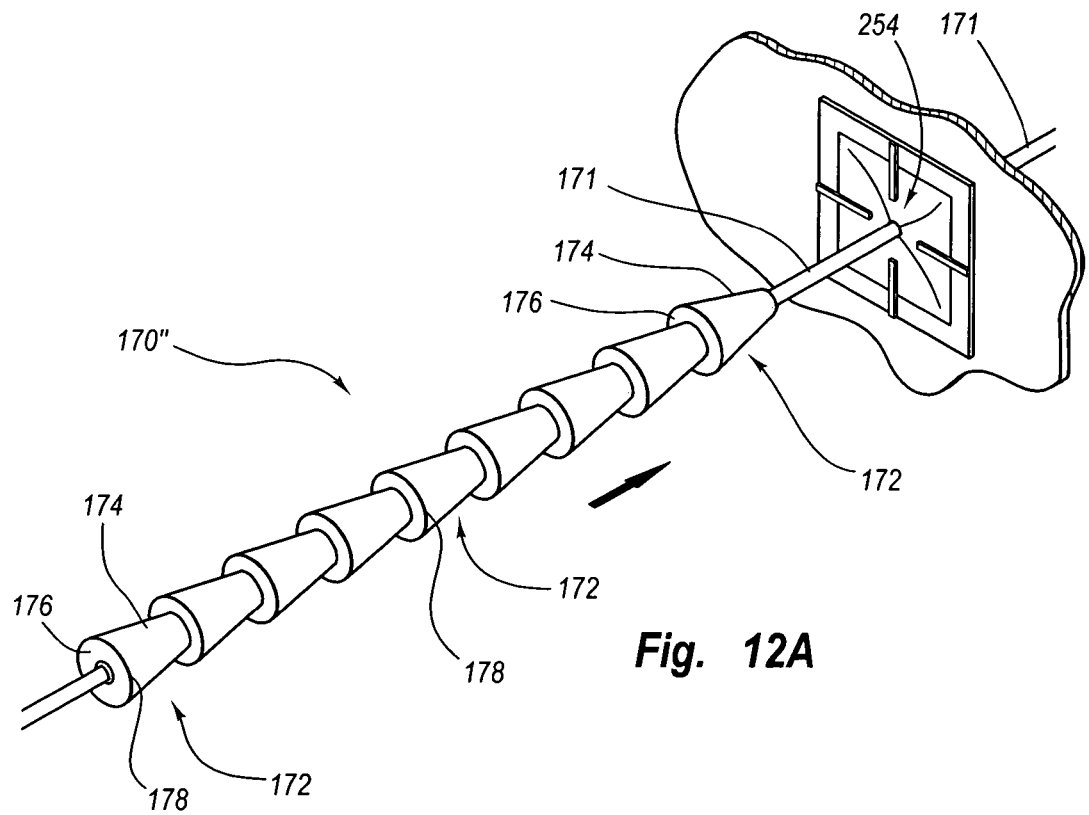
FIG. 12A is a side view of a cinch cord which has multiple cone-shaped stoppers to incrementally hold the cinch cord as it is advanced within the sleeve of a cinch tube.

FIG. 12A depicts an embodiment of a cinch cord at 170'' having a plurality of cone-shaped stoppers 172. Like the embodiment shown in FIG. 11 at 170' which has only a single stopper, each stopper 172 of cinch cord 170'' restricts movement of cinch cord 170'' back though aperture 254 once the respective stopper 172 has passed through aperture 254. This configuration also permits incrementally stopping the closure of a cinch tube as the sleeve of a cinch tube collapses inward due to movement of cinch cord 170''.

Cinch cord 170'' is shown in FIG. 12A with a connecting portion 171 extending through sleeve aperture 254. Each stopper 172 has a flared surface 174 which terminates at a base 176 which can also act as a brace surface. Tooth 178 is the region at the flared end of the stopper defined by flared surface 174 and base 176. As each stopper 172 passes through aperture 254, cinch cord 170" is held in place and the diameter of the cinch tube is incrementally decreased.

Figure 12B:
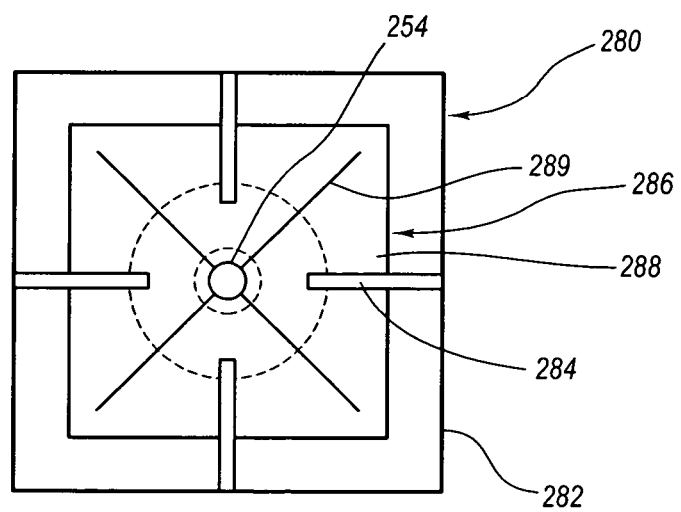
FIG. 12B is a plan view of a flexible tabbed aperture for engaging the multiple stoppers of the cinch cord shown in FIG. 12A.

FIG. 12B provides an enlarged view of a patch 280. Patch 280 comprises a frame 282 with retainers 284 extending from frame 282 inward toward aperture 254. Patch 280 also has a flexible component 286 comprising a plurality of tabs 288 which defines aperture 254. Sides 289 define each tab 288. Tabs 288 may be separated from each other, in contact with each other, adjoined at tear lines, etc. The plurality of flexible tabs 288 are reinforced by retainers 284 which are comparatively rigid. The combined configuration of tabs 288 and retainers 284 permits only one-way movement, the direction of displacement of cone-shaped stoppers 172 as indicated by the arrow in FIG. 12A. Bending of tabs 288 in the reverse direction is prevented by the position and rigidity of retainers 284. This configuration ensures a positive lock of cinch cord 170" at its maximum displaced position. Frame 282 and retainers 284 may be formed from a metal to obtain the desired rigidity while flexible component 286 may be formed from plastic.

Figure 13:
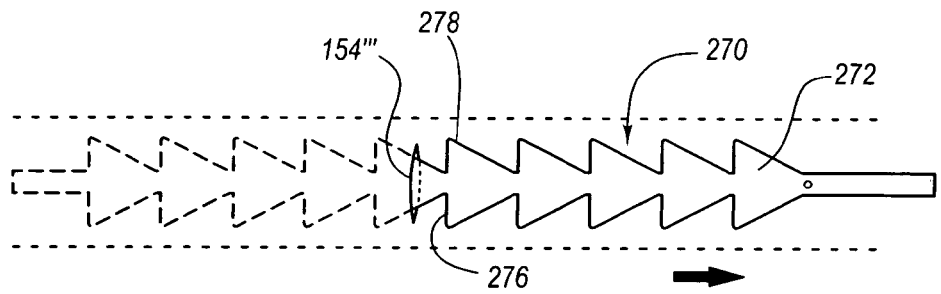
FIG. 13 is a perspective view of a cinch cord with multiple flat-wedged stoppers extending through a sleeve aperture which can be stretched.

FIG. 13 depicts cinch cord 270 with multiple flat-wedged stoppers 272 extending through a sleeve aperture 154'''. Cinch cord 270 is made of flexible plastic material and teeth 278 are sized such that they may move in one direction only through the aperture. Stated otherwise, base 276 is wider than sleeve aperture 154''' such that teeth 278 are displaced in one direction only, the direction which enables the cinch tube to be closed as indicated by the arrow.

Figure 14A:
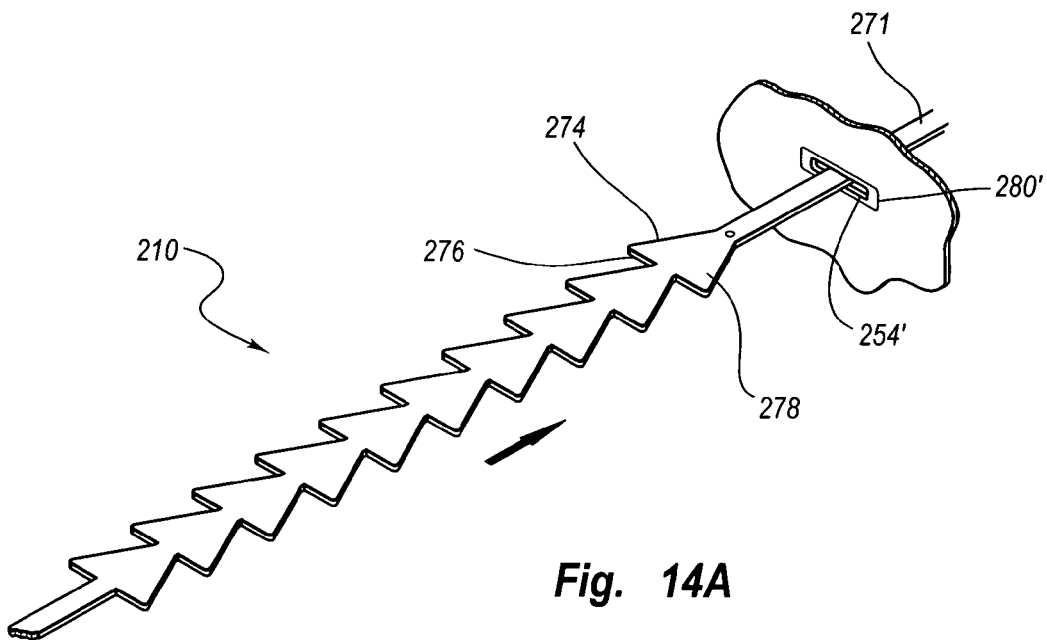
FIG. 14A is a perspective view of a cinch cord which has multiple flat-wedged stoppers to incrementally hold the cinch cord as it is advanced through a relatively rigid sleeve aperture of a cinch tube.
Figure 14B:
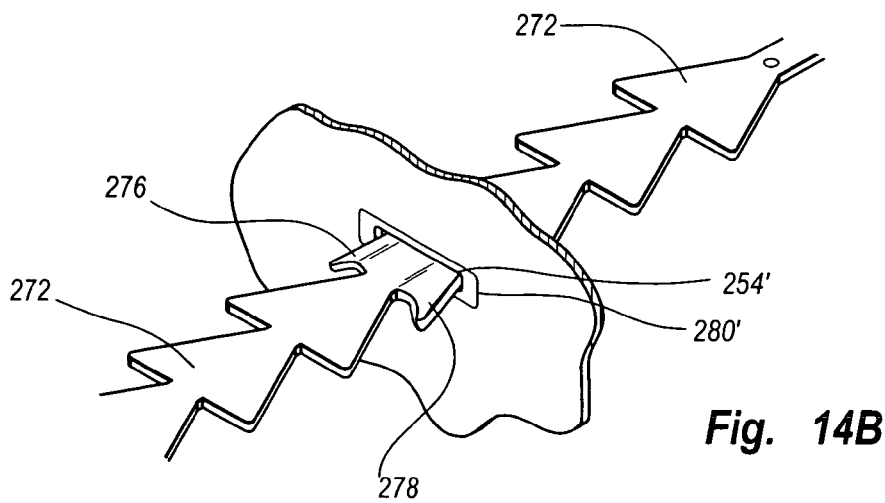
FIG. 14B is a close up view of the sleeve aperture shown in FIG. 14A as the teeth of one of the flat-wedged stoppers of the cinch cord flex to pass through the aperture of a cinch tube.

FIGS. 14A-14B depicts the same cinch cord shown in FIG. 13 at 270. However, aperture 254' is shown reinforced with an optional frame 280' which is relatively rigid. Frame 280' may be reinforced fabric, plastic or metal. As shown in FIG. 14B, teeth 278 of cinch cord 270 flex as they pass through aperture 254' and then flex back into their original shape as they clear aperture 254'. The result is that cinch cord 270 is locked at any displaced position.

Note that the embodiments shown in FIGS. 12A-12B, 13, and 14A-14B achieve the same result of ensuring incremental cinching, however, the functionality of the frames and the stoppers varies. In the embodiment shown in FIGS. 12A-12B, cone-shaped stoppers 172 of cinch cord at 170" are sufficiently rigid to cause retainers 284 extending from frame 282 to flex as retainers 284 encounter teeth 178. Of course, cone-shaped stoppers 172 also pass through flexible component 286 as tabs 288 are more flexible than retainers 284. This configuration is an example of a cinch cord having a plurality of stoppers configured to pass through the sleeve aperture upon airbag deployment and to resist re-entry into the sleeve aperture after airbag deployment due to the shape of the stoppers and the rigidity of the stoppers relative to any structures encountered by each stopper as each stopper passes through the sleeve aperture. In the embodiment shown in FIG. 13, teeth 278 are more flexible than the surfaces which define unframed aperture 154''' so teeth 278 flex while passing through unframed aperture 154'''. In the embodiment shown in FIGS. 14A-14B, aperture 254' is defined by frame 280' which provides a surface with greater rigidity than the surfaces which define unframed aperture 154'''. The greater rigidity enables teeth 278 to flex more readily as they pass through aperture 254'.

Figure 15:
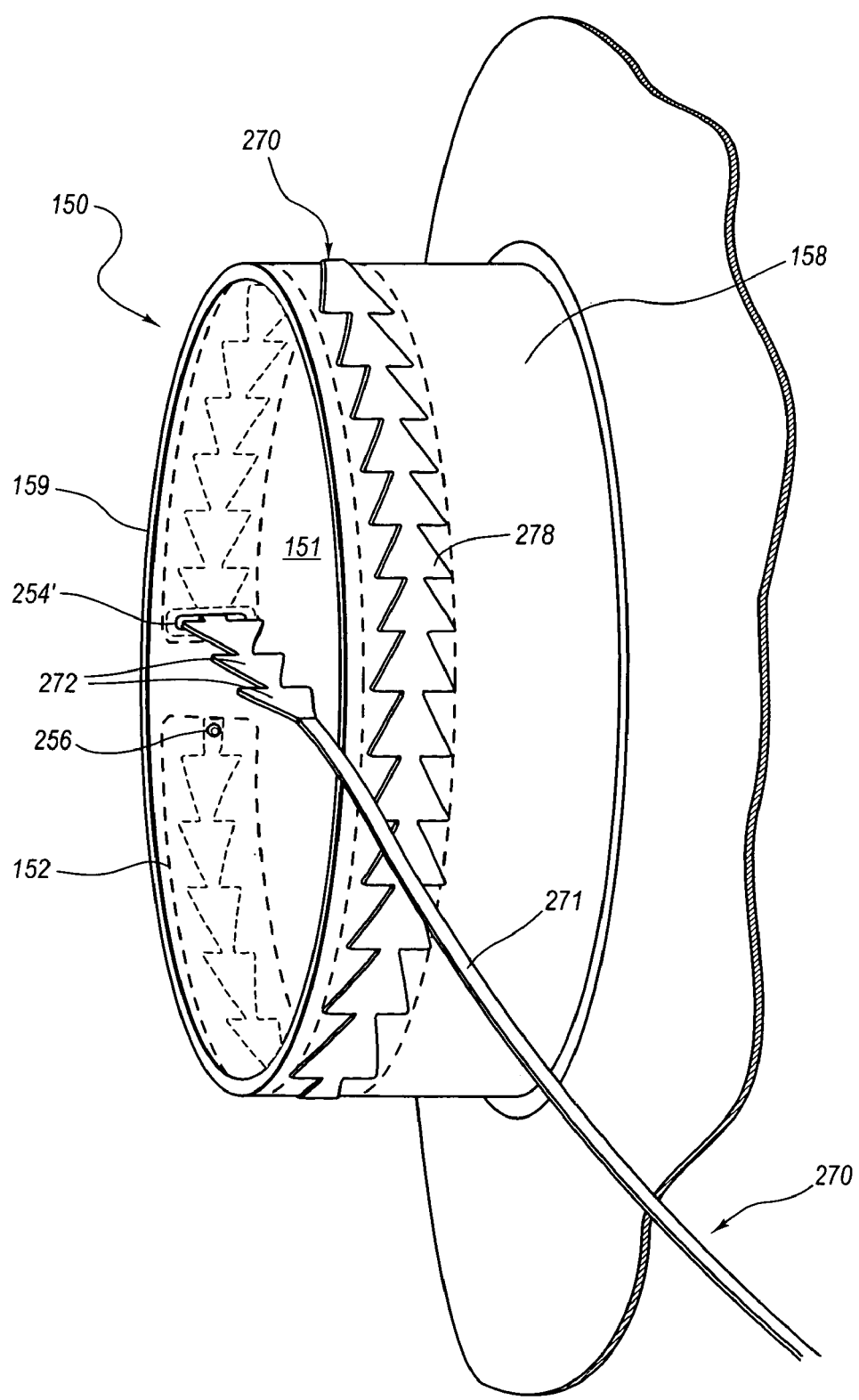
FIG. 15 is a perspective view of a cinch tube with a cinch cord having a plurality of flat-wedged stoppers.

The embodiment shown of cinch tube 150 shown in FIG. 15 is similar to the embodiment shown in FIG. 3A as both have a cinch cord anchored at one end and extending through an aperture of sleeve 152. However, the cinch cord shown in FIG. 15 at 270 corresponds with the cinch cord shown in FIGS. 14A-14B which has stoppers 272. Also, the aperture identified at 254' is shaped to permit the flexible release of teeth 278 while preventing re-entry of stoppers 272 through aperture 254'. During deployment cinch cord 270 is pulled thus displacing stoppers 272 through aperture 254' and ensuring a positive lock of the displaced cinch cord at aperture 254'.

Figure 16:
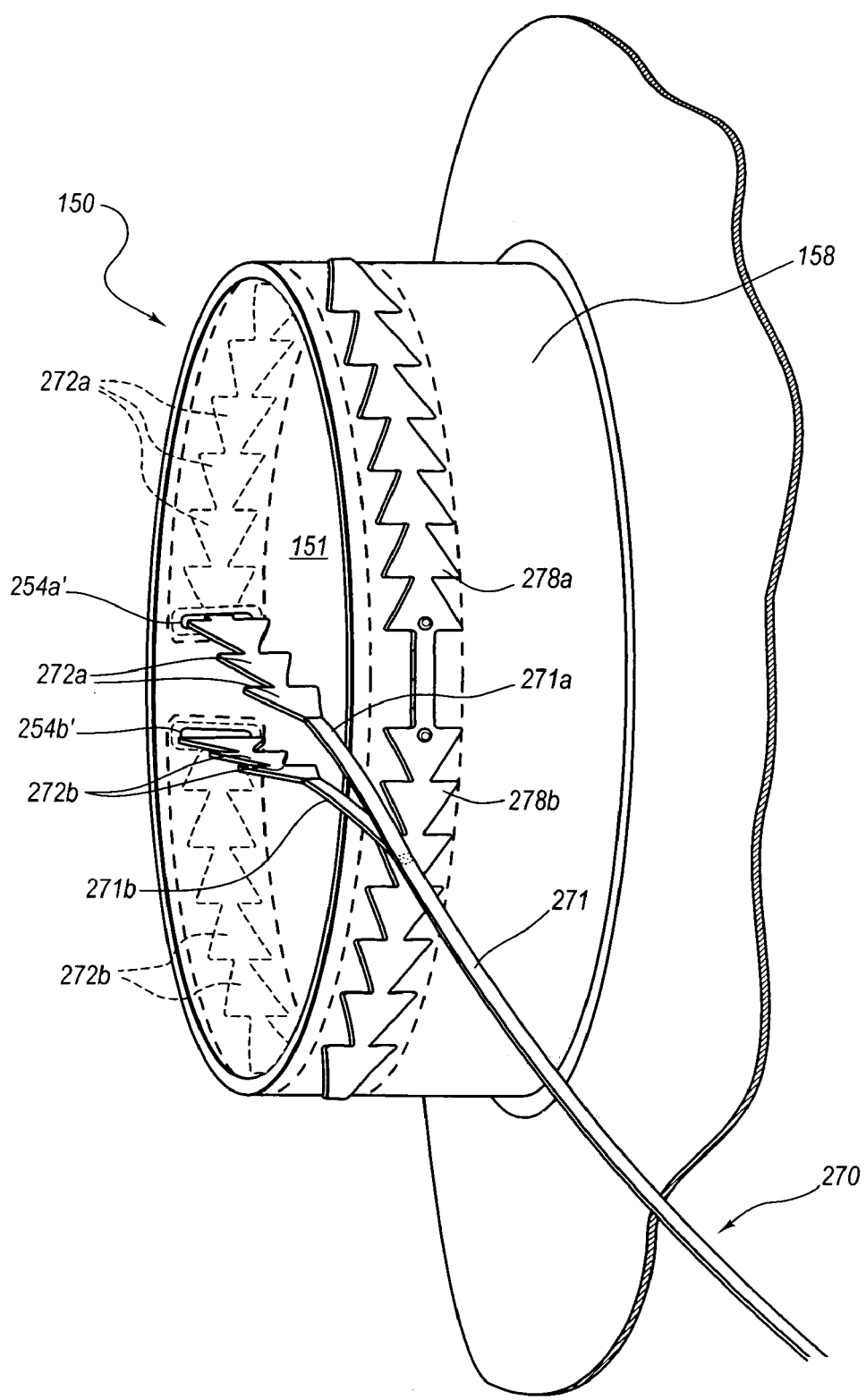
FIG. 16 is a perspective view of a cinch tube with a cinch cord which cinches in two directions.

FIG. 16 depicts a cinch tube with a cinch cord which cinches in two directions like the embodiments shown in FIGS. 4-5. The embodiment of the cinch tube shown in FIG. 16 at 150 is particularly similar to the embodiment shown in FIG. 4 as both have a cinch cord enclosed within a sleeve. However, the cinch cord shown in FIG. 16 at 270 has stoppers 272. During deployment, both sections are pulled through apertures 254a'-b' ensuring a positive lock of the sections of the disposed cord at apertures 254a'-b'.

The embodiments of the cinch cord disclosed herein with multiple stoppers maintain cinch tube closure so that once closed or partially closed the cinch tube does not re-open. These embodiments permit a positive lock of the cinch cord to be attained regardless of the amount of displacement of the cord through the sleeve of the cinch tube even at its maximum displaced position through the sleeve of the cinch tube.

Embodiments of cinch cords with multiple stoppers are also designed to prevent inadvertent closure. For example, these embodiments prevent the cinch tube from getting cinched during handling of the cushion for cushion or module assembly so that the cinch tube is not partially or fully closed prior to deployment. Inadvertent closure can be prevented by optimizing the load required to advance the cinch cord. For example, the size and elasticity of the teeth may be optimized such that they flex only at and above a certain load applied on the cinch cord, such as due to the force of airbag deployment, but do not flex when subjected to lower loads such as during handling of the cushion during cushion or module assembly. In summary, these embodiments ensure that the cinch tube is available to remain fully open in its pre-deployed state and to close as needed during airbag deployment.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for cinch tubes have been disclosed herein. The cinch tubes disclosed herein are examples of means for venting gas out of the airbag and circumventing an aperture disposed in the airbag. The combination of a sleeve of a cinch tube and a cinch cord, as disclosed herein, is an example of means for restricting gas venting by cinching the venting means to reduce the circumference of the venting means upon inflatable airbag deployment without obstruction and enabling the venting means to remain open upon inflatable airbag deployment with obstruction. The combination of a sleeve of a cinch tube and a cinch cord with a plurality of stoppers, as disclosed herein, is an example of means for restricting gas venting by incrementally cinching the venting means to reduce the circumference of the venting means upon inflatable airbag deployment without obstruction and enabling the venting means to remain open upon inflatable airbag deployment with obstruction. The diffusers disclosed herein are examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112¶6.

The invention claimed is:

1. An airbag module, comprising:
an inflatable airbag cushion;
a cinch tube disposed on the inflatable airbag cushion and circumventing an aperture disposed in the inflatable airbag cushion; and
a cinch cord coupled to the cinch tube and the inflatable airbag cushion such that upon inflatable airbag deployment with obstruction, the cinch cord does not fully extend and the cinch tube remains open, and upon inflatable airbag deployment without obstruction, the cinch cord extends and at least partially closes the cinch tube; and
a diffuser configured to re-direct inflation gas to the cinch tube from an inflator such that the gas rapidly exits the inflatable airbag cushion via the cinch tube when deployment of the airbag is obstructed;
wherein the diffuser is configured for alignment with the cinch tube if deployment is obstructed.

2. The airbag module of claim 1, wherein the diffuser has an opening to receive gas and at least one opening to re-direct the gas to the cinch tube.

3. The airbag module of claim 1, wherein the diffuser is attached to the inflatable airbag cushion.

4. The airbag module of claim 1,
wherein upon inflatable airbag deployment without obstruction, the cinch cord extends and completely closes the cinch tube; and
wherein the diffuser is attached to the inflatable airbag cushion.

5. The airbag module of claim 1, wherein the cinch tube and the diffuser transition to being non-aligned if deployment is not obstructed, due to movement of the cinch tube relative to the diffuser, such that the inflation gas is directed out of the diffuser and into the airbag cushion, and such that the inflation gas is not directed out of the diffuser directly toward the cinch tube.

6. An airbag module, comprising:
an inflatable airbag cushion;
a cinch tube disposed on the inflatable airbag cushion and circumventing an aperture disposed in the inflatable airbag cushion; and
a cinch cord coupled to the cinch tube and the inflatable airbag cushion such that upon inflatable airbag deployment with obstruction, the cinch cord does not fully extend and the cinch tube remains open, and upon inflatable airbag deployment without obstruction, the cinch cord extends and at least partially closes the cinch tube; and
a diffuser configured to re-direct inflation gas to the cinch tube from an inflator such that the gas rapidly exits the inflatable airbag cushion via the cinch tube when deployment of the airbag is obstructed;
wherein the cinch tube comprises a sleeve extending around the majority of the perimeter of the cinch tube, and the sleeve has a sleeve aperture; and
wherein a portion of the cinch cord extends in the sleeve, and wherein the cinch cord further comprises at least one stopper configured to pass through the sleeve aperture upon airbag deployment and to resist entry into the sleeve aperture after airbag deployment.

7. An airbag module, comprising:
an inflatable airbag cushion;
a cinch tube disposed on the inflatable airbag cushion and circumventing an aperture disposed in the inflatable airbag cushion; and
a cinch cord coupled to the cinch tube and the inflatable airbag cushion such that upon inflatable airbag deployment with obstruction, the cinch cord does not fully extend and the cinch tube remains open, and upon inflatable airbag deployment without obstruction, the cinch cord extends and at least partially closes the cinch tube; and
a diffuser configured to re-direct inflation gas to the cinch tube from an inflator such that the gas rapidly exits the inflatable airbag cushion via the cinch tube when deployment of the airbag is obstructed;
wherein the diffuser and the cinch tube are configured to become non-aligned if deployment is not obstructed;
wherein the diffuser is attached to the inflatable airbag cushion; and
wherein the cinch cord is coupled to an internal surface of the inflatable airbag cushion and the cinch cord is disposed within an airbag interior.

8. An airbag module, comprising:
an inflatable airbag cushion;
a first cinch tube disposed on the inflatable airbag cushion and circumventing a first aperture disposed in the inflatable airbag cushion; and
a first cinch cord coupled to the first cinch tube and the inflatable airbag cushion such that upon deployment of the inflatable airbag cushion with obstruction, the first cinch cord does not fully extend and the first cinch tube remains open, and upon deployment of the inflatable airbag cushion without obstruction, the first cinch cord extends and at least partially closes the first cinch tube;
a second cinch tube disposed on the inflatable airbag cushion and circumventing a second aperture disposed in the inflatable airbag cushion; and
a second cinch cord coupled to the second cinch tube and extending around a majority of the perimeter of the second cinch tube, the second cinch cord further coupled to a surface of the inflatable airbag cushion such that upon deployment of the inflatable airbag cushion with obstruction, the second cinch cord does not fully extend and the second cinch tube remains open, and upon deployment of the inflatable airbag cushion without obstruction, the second cinch cord extends and at least partially closes the second cinch tube; and
a diffuser positioned within the inflatable airbag cushion to receive gas from an inflator,
wherein the diffuser has a first opening and a second opening,
wherein the openings of the diffuser are configured to re-direct inflation gas from an inflator,
wherein the openings of the diffuser and the cinch tubes remain aligned to enable inflation gas to rapidly exit the inflatable airbag cushion when deployment of the airbag is obstructed such that inflation gas exits the first cinch tube via the first opening of the diffuser and inflation gas exits the second cinch tube via the second opening of the diffuser, and wherein the openings of the diffuser and the cinch tubes are configured to transition to non-alignment if deployment is not obstructed.

9. The airbag module of claim 8, wherein the first and second cinch tubes are symmetrically disposed on the airbag.

10. The airbag module of claim 8, further comprising a vent disposed on the airbag and adapted to vent gas during airbag deployment with and without obstruction.

11. An airbag module, comprising:
an inflatable airbag cushion;
a first cinch tube disposed on the inflatable airbag cushion and circumventing a first aperture disposed in the inflatable airbag cushion;
a second cinch tube disposed on the inflatable airbag cushion and circumventing a second aperture disposed in the inflatable airbag cushion;
at least one cinch cord coupled to the inflatable airbag cushion such that upon inflatable airbag deployment with obstruction, the cinch tubes remain open, and upon inflatable airbag deployment without obstruction, the cinch tubes are at least partially closed; and
a diffuser positioned to re-direct inflation gas from an inflator,
wherein the diffuser has a first opening and a second opening,
wherein the openings of the diffuser are configured to re-direct inflation gas from an inflator,
wherein the openings of the diffuser and the cinch tubes remain aligned to enable inflation gas to rapidly exit the inflatable airbag cushion when deployment of the airbag is obstructed such that inflation gas exits the first cinch tube via the first opening of the diffuser and inflation gas exits the second cinch tube via the second opening of the diffuser, and
wherein the openings of the diffuser and the cinch tubes are configured to transition to non-alignment if deployment is not obstructed.

12. An airbag module, comprising:
an inflatable airbag cushion;
a cinch tube disposed on the inflatable airbag cushion and circumventing an aperture disposed in the inflatable airbag cushion; and
a cinch cord coupled to the cinch tube and the inflatable airbag cushion such that upon inflatable airbag deployment with obstruction, the cinch cord does not fully extend and the cinch tube remains open, and upon inflatable airbag deployment without obstruction, the cinch cord extends and at least partially closes the cinch tube; and
a diffuser configured to re-direct inflation gas to the cinch tube from an inflator such that the gas rapidly exits the inflatable airbag cushion via the cinch tube when deployment of the airbag is obstructed, wherein the diffuser and the cinch tube are configured to be aligned if deployment is obstructed to permit rapid venting of inflation gas, and wherein the diffuser and the cinch tube are configured for transition to non-alignment if deployment is not obstructed.

13. The airbag module of claim 12, wherein the diffuser has an opening to receive gas and at least one opening to re-direct the gas to the cinch tube.

14. An airbag module, comprising:
an inflatable airbag cushion;
a first cinch tube disposed on the inflatable airbag cushion and circumventing a first aperture disposed in the inflatable airbag cushion;
a second cinch tube disposed on the inflatable airbag cushion and circumventing a second aperture disposed in the inflatable airbag cushion;
at least one cinch cord coupled to the inflatable airbag cushion such that upon inflatable airbag deployment with obstruction, the cinch tubes remain open, and upon inflatable airbag deployment without obstruction, the cinch tubes are at least partially closed; and
a diffuser having an opening to receive gas from an inflator, a first side opening, and a second side opening, wherein the diffuser is configured to re-direct inflation gas from an inflator to the cinch tubes via the side openings to enable gas to rapidly exit the inflatable airbag cushion when deployment of the airbag is obstructed; and
wherein the first side opening of the diffuser and the first cinch tube are configured to be aligned and the second side opening of the diffuser and the second cinch tube are configured to be aligned if deployment is obstructed to permit rapid venting of inflation gas, and wherein the diffuser and the cinch tubes are configured for transition to non-alignment if deployment is not obstructed.

15. The airbag module of claim 14, wherein the first and second cinch tubes are symmetrically disposed on the airbag.

16. The airbag module of claim 14, further comprising a vent disposed on the airbag and adapted to vent gas during airbag deployment with and without obstruction.

17. An airbag cushion module, comprising:
an inflatable airbag cushion;
means for venting gas out of the inflatable airbag cushion and circumventing an aperture disposed in the inflatable airbag cushion;
means for restricting gas venting by cinching the venting means to reduce the circumference of the venting means upon inflatable airbag deployment without obstruction and enabling the venting means to remain open upon inflatable airbag deployment with obstruction; and
means for diffusing gas by re-directing inflation gas to the venting means from an inflator such that the gas rapidly exits the inflatable airbag cushion via the venting means when deployment of the airbag is obstructed,
wherein the means for diffusing gas and the venting means are aligned if deployment is obstructed to permit rapid venting of inflation gas, and
wherein the means for diffusing gas and the venting means transition to non-alignment if deployment is not obstructed, due to movement of the venting means relative to the means for diffusing gas, such that the inflation gas is directed out of the means for diffusing gas and into the airbag cushion, and such that the inflation gas is not directed out of the means for diffusing gas directly toward the venting means.

* * * * *

UNITED STATES PATENT AND TRADEMARK OFFICE
CERTIFICATE OF CORRECTION

PATENT NO. : 7,614,654 B2 Page 1 of 1
APPLICATION NO. : 11/296031
DATED : November 10, 2009
INVENTOR(S) : Jeffrey D. Williams It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this

Nineteenth Day of October, 2010

David J. Kappos
*Director of the United States Patent and Trademark Office*